Nov. 10, 1959 M. R. NICKELSON 2,912,083
ACCELERATOR PEDAL ATTACHMENT
Filed Feb. 28, 1957 2 Sheets-Sheet 1
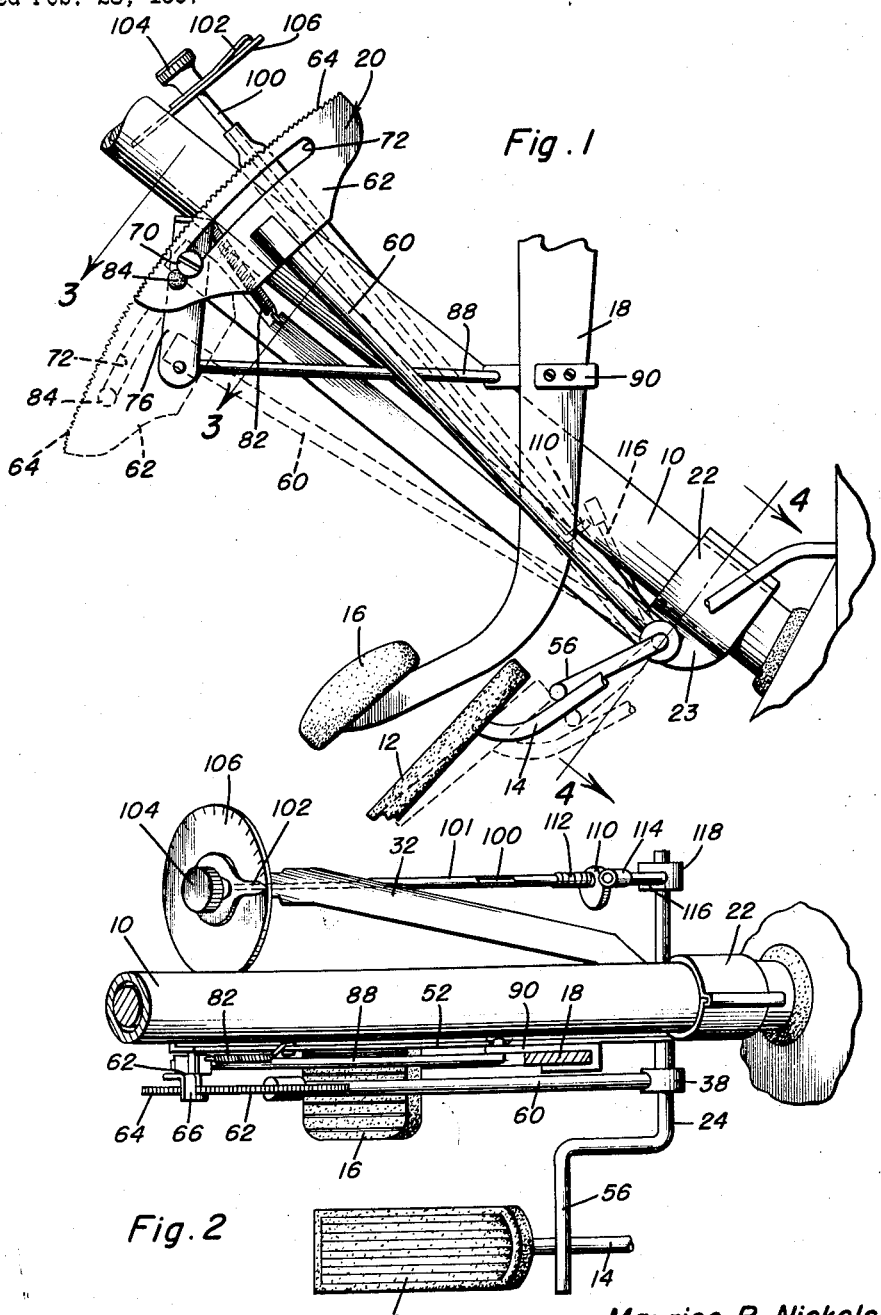
Maurice R. Nickelson
INVENTOR.

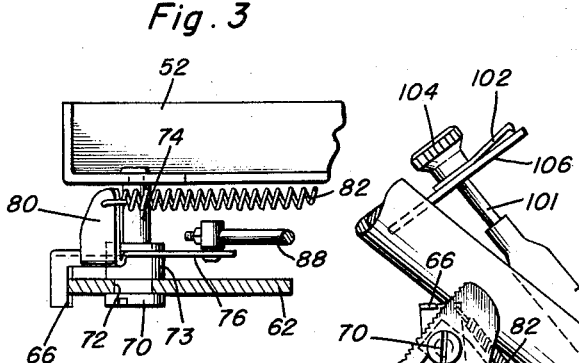
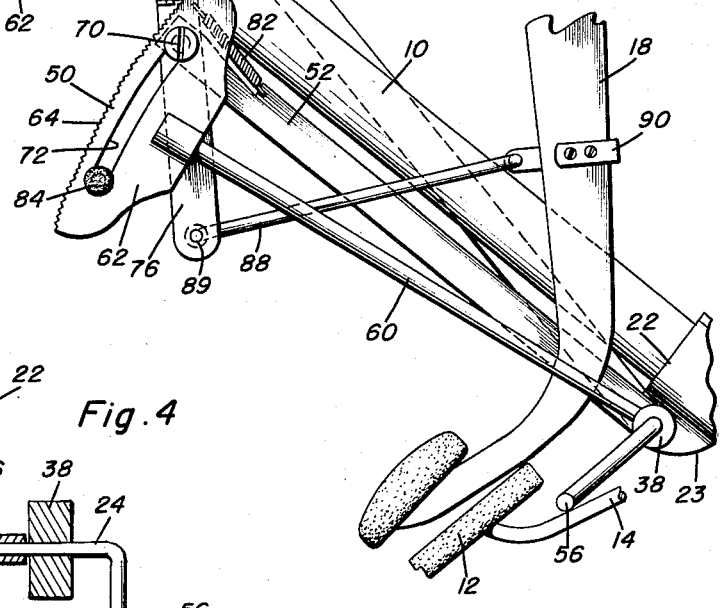
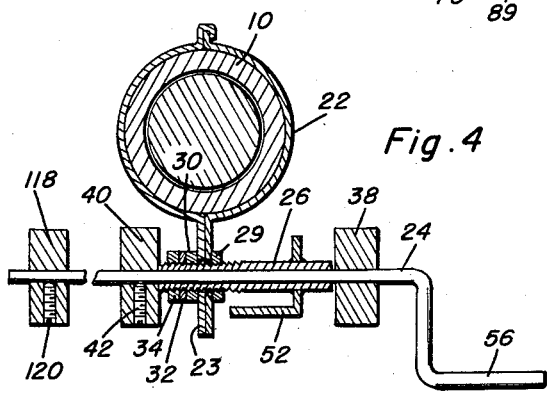
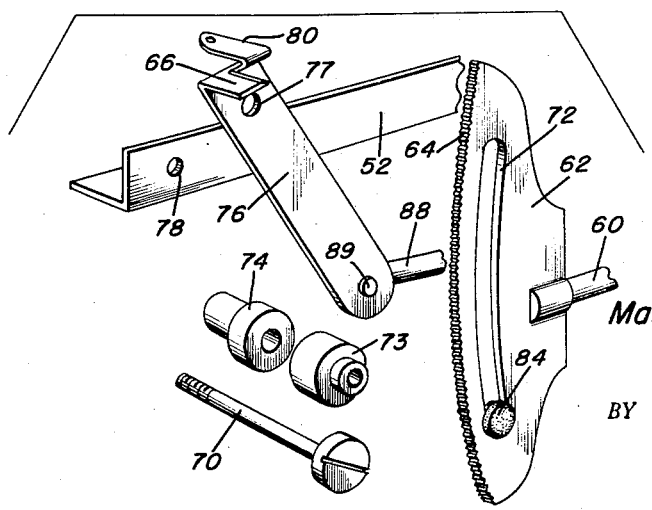
Maurice R. Nickelson
INVENTOR.

United States Patent Office 2,912,083
Patented Nov. 10, 1959

2,912,083
ACCELERATOR PEDAL ATTACHMENT
Maurice R. Nickelson, Clio, Mich.
Application February 28, 1957, Serial No. 643,061
8 Claims. (Cl. 192—3)

This invention relates to an attachment for a motor vehicle which enables the motorist to be free from the tedious task of holding the accelerator pedal depressed for long periods of time at approximately the same position.

An object of the invention is to provide an attachment for a motor vehicle which dispenses with the motorist's necessity of holding the accelerator pedal depressed for long periods of time. This is achieved by providing a special structure which is so arranged that when the accelerator pedal of the motor vehicle is depressed with the right foot and the brake pedal of the motor vehicle depressed slightly, a latch is released, enabling an accelerator pedal arm to fall onto the accelerator pedal linkage. The latch automatically engages upon release of the brake pedal, but the accelerator pedal arm retains the linkage in the slightly depressed condition until released by again depressing the brake pedal to release the latch and enable the spring action of the accelerator pedal linkage to return the accelerator linkage and the linkage depressing arm to the original position.

A further object of the invention is to provide an attachment as described above wherein there are means under the control of the motorist for setting the limits of the position of the accelerator linkage depressing arm. These means may be calibrated in miles per hour and they establish the distance which the arm may be gravity lowered, thereby establishing the amount of accelerator pedal depression which will be retained by the invention.

One of the important features of the invention is the safety with which it may be used. In order to set the attachment for a particular speed, the motorist must perform several steps and the likelihood of these steps being performed accidently and in the proper sequence is negligible. The first step is that the motorist must maintain a force applied to the accelerator pedal and at the same time lightly touch the brake pedal and maintain the force on the accelerator pedal until the light pressure on the brake pedal is removed. This is essential for the latch to be set, parts of this procedure being insufficient. Moreover, there is absolutely no interference to the depression of the accelerator pedal so that the throttle is in the full open position when the motorist desire to accelerate.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational side view of a part of the interior of a motor vehicle which has an attachment constructed in accordance with my invention disposed operatively therein;

Figure 2 is a sectional view looking downward on the attachment and parts of the motor vehicle with which the attachment is connected;

Figure 3 is a fragmentary, sectional view taken approximately on the line 3—3 of Figure 1;

Figure 4 is a sectional view taken on the line 4—4 of Figure 1;

Figure 5 is an elevational view of the attachment in Figure 1, showing the same in a second position; and Figure 6 is an exploded, perspective view showing the latch which constitutes a part of the invention.

In the accompanying drawings, there is a steering column 10 of a motor vehicle, an accelerator pedal 12, accelerator pedal linkage 14 connected therewith, brake pedal 16 and brake arm 18 to which the brake pedal is secured. The attachment 20, exemplifying the invention, is operatively connected with these parts and assemblies of the motor vehicle. Attachment 20 consists of a clamp 22 which is bolted or otherwise secured in proper place on the steering column 10 and which has a mounting bracket 23 protruding therefrom and in a generally downward direction. An arm 24 is passed through a sleeve bearing 26, the latter being mounted for rotation in bracket 23, which is on clamp 22. Jam nuts 29 and 30 are threaded on the exterior surface of sleeve bearing 26 and abut opposite faces of the bracket 23, but they are not drawn up tight enough to frictionally hold the sleeve bearing 26 against rotation. Support 32 is disposed on sleeve bearing 26 between jam nut 30 and jam nut 34, these nuts pressing against the inner extremity of support 32 and holding it fixed to the sleeve bearing 26 for movement therewith. Stops 38 and 40 are mounted on arm 24 at opposite ends of sleeve bearing 26. Stop 38 is welded to arm 24, while stop 40 is held in place by set screw 42 so that the proper adjustment between the stops may be obtained and held.

Latch 50 is at the upper end of support 52, the lower end of the support being welded to sleeve bearing 26. The purpose of the latch is to hold arm 24 in a selected position and release the arm in response to initial and slight actuation of the foot brake. Arm 24 has an angulated end 56 which is disposed on the accelerator pedal linkage 14 (Figures 1 and 5) and holds the linkage depressed a preselected amount in accordance with the setting of latch 50. The latch parts are shown in Figure 6 and they comprise a lever 60 having plate 62 at the upper extremity and a row 64 of teeth along one edge thereof. Pawl 66 is engageable with the teeth and is mounted pivotally on spindle 70. Arcuate slot 72 in plate 62 has the spindle passed through it, this spindle also passing through bushing 73 and bushing 74, with lever 76 located therebetween. The lever has a hole 77 through which spindle 70 passes, and the end of the spindle is threaded in a tapped opening 78 in support 52. Pawl 66, in the form of a laterally projecting knife edge, is at one end of the lever 76. Ear 80 is at the same end of the lever 76 and has a spring 82 attached at one end thereto. The opposite end of the spring is attached in a hole formed in the support 52 so that spring 82 constantly biases the lever 76 in such direction that the pawl 66 is in engagement with the row of teeth 64. By having spindle 70 pass through slot 72, the movement of lever 60 with respect to support 52 is constrained. In addition, a rubber stop 84 is at the lower extremity of slot 72, thereby forming a bumper for the spindle 70.

There are means to release the latch 50 by separating the pawl 66 from engagement with the row 64 of teeth. These means comprise a rod 88 having one end connected by pivot 89 to the end of lever 76 opposite to the pawl 66. Clamp 90 is at the opposite end of rod 88 and is attached onto the brake arm 18, so that when the brake arm is actuated a very slight distance, the movement thereof is imparted to lever 76 in the form of an oscillation about spindle 70. This separates the dog 66 from the row 64 of teeth and enables the plate 62 to be gravity lowered. Inasmuch as the oposite end of the lever 60 is fixed to the stop 38, and the stop is welded or otherwise secured to the arm 24, the arm will be rotated in bearing 26.

There are means connected to arm 24 for manually selecting the speed at which the motorist desires his vehicle to be operated. These means comprise a shaft 100 whose upper end is mounted for rotation in a bearing on support 32. Pointer 102 and knob 104 are fixed to the upper extremity of shaft 100. The pointer 102 coacts with graduations on disk or some other type of face 106 carried by support 32. The graduations may be in miles per hour or some other easily read and convenient system. Bearing 101 in which shaft 100 is mounted for rotation has considerable length, terminating slightly above cam 110 that is fixed to the lower extremity of shaft 100. Spring 112 seats on the end of bearing 101 and on the cam 110 in order to form a tensioning means for the shaft 100. Cam 110 abuts bumper 114 on the end of spindle 116. This spindle is fixed to collar 118, and the latter is secured on arm 24 by set screw 120 (Figure 4) so that it may be adjusted to the desired position and fixed in adjustment.

In operation, the motorist with his right foot depresses the accelerator pedal to the point where he desires it to remain. Then, by lightly touching the brake pedal 16, the latch 50 is released by having the pawl 66 separated from the row 64 of teeth on plate 62 as described previously. Lever 60 is gravity lowered, thereby rotating arm 24 till the offset part 56 thereof comes in contact with linkage 14. Spring 82 returns the pawl into engagement with a new part of the row of teeth, establishing a definite relationship of adjustment between the arm 24 and the bearing which supports it. Accordingly, the accelerator pedal and its linkage cannot return by the accelerator linkage return spring (unshown) installed as original equipment with the motor vehicle. There is no interference with the depressing of the accelerator pedal 12 to a further position, as for passing or merely increasing speed of the motor vehicle. And, when the motorist removes the additional pressure from the accelerator pedal 12, it will return only to the preselected position and not to the fully returned position inasmuch as arm 24 will not allow the pedal to be fully returned. But, the pedal may be returned at the desire of the motorist by merely again touching the brake pedal 16, thereby causing the latch 50 to again release.

The same results as to setting the speed of the motor vehicle may be obtained by rotating the knob 104. Such rotation causes the arm 116 to be displaced, thereby causing the arm 24 to be rotated in its sleeve bearing 26 to a new position, for example, the position shown in dotted line in Figure 1. This is permissible, though, only after the latch 50 is first released by slightly depressing the brake pedal 16 as described previously in connection with the setting of the attachment by gravity.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention as claimed.

What is claimed as new is as follows:

1. For use in a motor vehicle which has a brake pedal, a brake arm to which said pedal is attached, an accelerator for the motor vehicle, a safety attachment to hold the accelerator in a depressed position, said attachment comprising an offset arm, a bearing in which said arm is mounted for oscillation, means mounting said bearing in the motor vehicle adjacent to the accelerator pedal, a pivotally mounted latch, a lever connected to said arm, a ratchet carried by said lever, said latch normally pivoted so as to engage said ratchet and retain said lever and said arm in a selected position with said arm bearing on said accelerator, means responsive to the actuation of said brake pedal and brake arm for pivoting said latch to disengage said latch from said ratchet whereby said lever and arm freely fall to a position corresponding to a depressed condition of the accelerator, means responsive to the release of said brake pedal and brake arm to allow said latch to reengage said ratchet for locking said arm on said depressed accelerator.

2. The combination of claim 1 wherein the accelerator has a return spring which is arranged to return the accelerator pedal to the idle position and which moves said arm to a corresponding position when said latch is disengaged from said ratchet while the accelerator is not in a depressed condition.

3. The combination of claim 2 wherein there are additional manually operable means for establishing a limit for the adjustment of said arm, said manually adjustable means being operatively connected to said arm.

4. The combination of claim 3 wherein said manually adjustable means includes a second arm protruding laterally from said first arm and adjustably secured thereto, and means including a manually adjustable member for moving said second arm and retaining said second arm in the moved position.

5. The combination of claim 4 wherein the last mentioned means includes a member which is calibrated in miles per hour.

6. An attachment for a motor vehicle to select a setting for the accelerator, said attachment comprising an arm, said arm overlying said accelerator, a bearing in which said arm is mounted for oscillation, means mounting said bearing in the motor vehicle adjacent to the accelerator pedal, said arm having an offset which is adapted to contact the accelerator linkage, a lever fixed to said arm and protruding laterally therefrom, said lever carrying a ratchet thereon, a pivotally mounted latch adapted to engage said ratchet to retain said lever in a selected position, and means responsive to the initial actuation of the foot brake of the motor vehicle for pivoting said latch to disengage said latch from said ratchet and allow said arm to freely fall to a new position in bearing contact with said accelerator linkage when said accelerator linkage is simultaneously depressed.

7. An attachment for a motor vehicle to select a setting for the accelerator, said attachment comprising an arm, said arm overlying said accelerator, a bearing in which said arm is mounted for oscillation, means mounting said bearing in the motor vehicle adjacent to the accelerator pedal, said arm having an offset which is adapted to contact the accelerator linkage, a lever fixed to said arm and protruding laterally therefrom, said lever carrying a ratchet thereon, a pivotally mounted latch adapted to engage said ratchet to retain said lever in a selected position, and means responsive to the initial actuation of the foot brake of the motor vehicle for pivoting said latch to disengage said latch from said ratchet and allow said arm to freely fall to a new position in bearing contact with said accelerator linkage when said accelerator linkage is simultaneously depressed, the return spring of the accelerator linkage being adapted to return said arm to the idle position along with the accelerator pedal when said latch is released and the accelerator linkage is not simultaneously depressed, and manually operable means for selecting and establishing a stop position for said arm.

8. The attachment of claim 7 wherein said manually operable means includes a cam, a second arm adjustably secured to said arm and contactable by said cam, and means to rotate said cam and hold said cam in a selected rotated position.

(References on following page)

References Cited in the file of this patent

UNITED STATES PATENTS

| | | |
|---|---|---|
| 1,548,725 | Manwaring | Aug. 4, 1925 |
| 1,855,538 | Abel | Apr. 26, 1932 |
| 2,143,318 | Isbell | Jan. 10, 1939 |
| 2,167,843 | Johnson | Aug. 1, 1939 |
| 2,568,454 | Laverents | Sept. 18, 1951 |

FOREIGN PATENTS

| | | |
|---|---|---|
| 202,477 | Australia | Dec. 1, 1955 |